S. S. HOLLINGSWORTH.
PLOW SHIFTER FOR TRACTION ENGINES.
APPLICATION FILED OCT. 5, 1916.
1,236,713.
Patented Aug. 14, 1917.
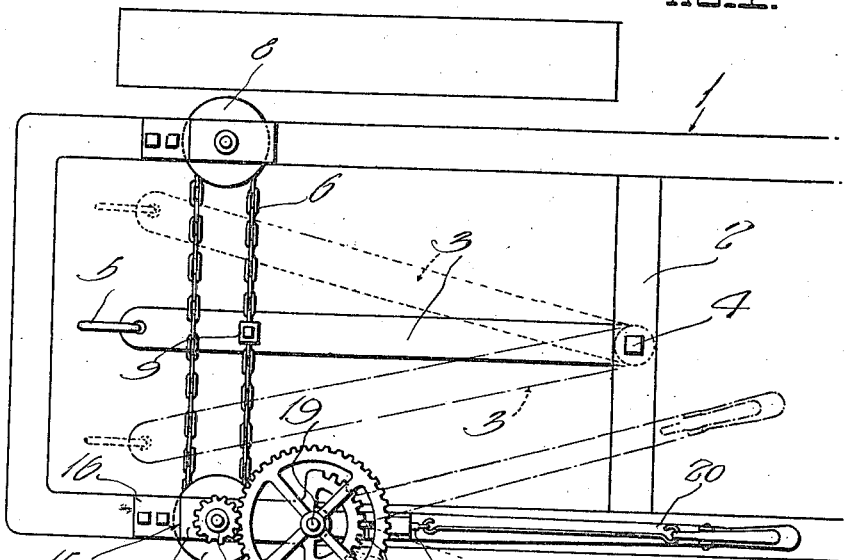
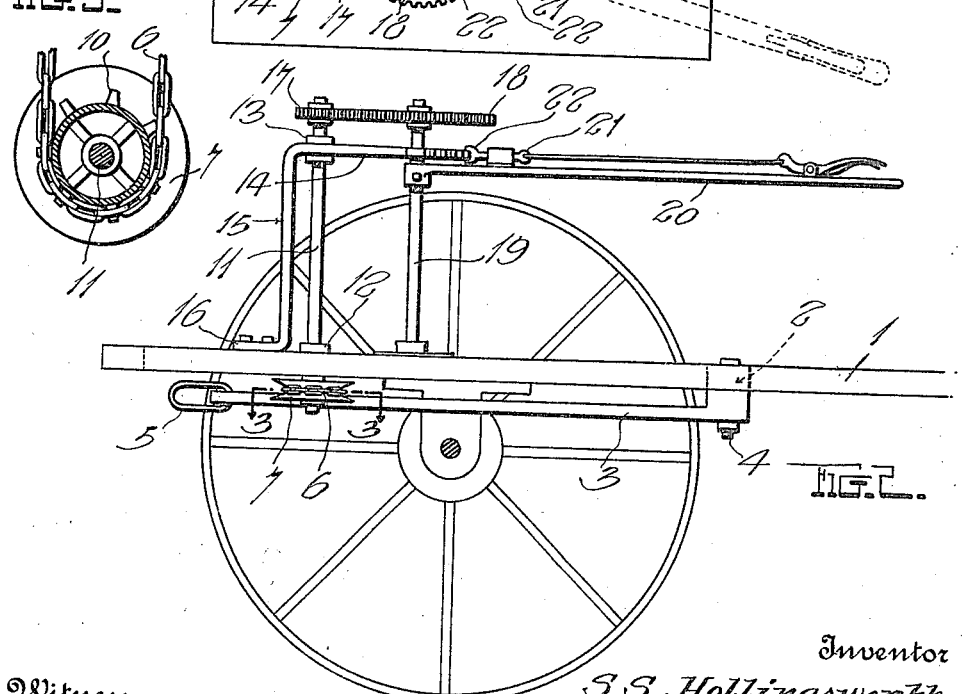
Witness
H. Woodard
Inventor
S. S. Hollingsworth
By
Attorneys

UNITED STATES PATENT OFFICE.

SPEAR S. HOLLINGSWORTH, OF VINCENNES, INDIANA, ASSIGNOR, BY DIRECT AND MESNE ASSIGNMENTS, OF ONE-THIRD TO JAMES W. EMISON, OF VINCENNES, INDIANA, AND ONE-THIRD TO JACOB S. SPIKER AND NOBLE SPIKER, BOTH OF KNOX COUNTY, INDIANA.

PLOW-SHIFTER FOR TRACTION-ENGINES.

1,236,713.     Specification of Letters Patent.     Patented Aug. 14, 1917.

Application filed October 5, 1916. Serial No. 123,846.

*To all whom it may concern:*

Be it known that I, SPEAR S. HOLLINGSWORTH, a citizen of the United States, residing at Vincennes, in the county of Knox, State of Indiana, have invented certain new and useful Improvements in Plow-Shifters for Traction-Engines; and I do hereby declare the following to be a full, clear, and exact description of the invention, such as will enable others skilled in the art to which it appertains to make and use the same.

My invention has for its object to provide simple and efficient means for adjusting the pivoted draw-bars of tractors so as to shift the line of draft toward either side of the machine. By so doing, the tractor is permitted to draw a plow or other implement so as to cultivate more land than is otherwise possible when turning corners. The invention is also of advantage in plowing headlands.

With the foregoing general object in view, the invention resides in the novel construction and combination of parts hereinafter more fully described and claimed, the descriptive matter being supplemented by the accompanying drawing, which constitutes a part of this specification and in which:

Figure 1 is a diagrammatic top plan view of a tractor showing the application of the invention;

Fig. 2 is a side elevation of Fig. 1 with one of the tractor wheels removed; and, Fig. 3 is a detail horizontal section on the plane of the line 3—3 of Fig. 2.

In the drawings above briefly described, the numeral 1 has reference to the frame or chassis of a tractor, said frame being shown as including a transverse bar 2 to which the longitudinally disposed draw-bar 3 is pivoted at 4 for horizontal swinging, the rear end of said draw-bar having any preferred means 5 whereby a plow or any other implement may be attached thereto. An endless chain 6 is passed around peripherally grooved wheels 7 and 8 adjacent the opposite sides of the frame 1 and at the point 9 one reach of said chain is connected to the pivoted draw-bar 3, whereby movement of said chain will swing the bar 3 to and between the positions shown in dotted lines in Fig. 1.

The wheel 7 is provided with teeth 10 located within its groove for engagement with the chain 6, and said wheel is by preference carried on the lower end of a vertical shaft 11 mounted rotatably in any suitable manner. The lower end of the shaft 11 is shown in the present embodiment of the invention as being mounted in a bearing 12 on the frame 1 while the bearing 13 receives the upper end of said shaft, said last named bearing being carried by the horizontal arm 14 of an inverted L-shaped bracket 15 which is by preference provided with a foot 16 bolted to the frame 1. A pinion 17 is secured on the upper end of the shaft 11 and meshes with a gear 18 on a vertical shaft 19 which is mounted similarly to the shaft 11, said shaft 19 being provided with a hand lever 20 whereby it may be rocked at will. A dog 21 and rack 22 are preferably employed for holding the lever 20 in adjusted position, said rack being formed on the free end of the arm 14 as shown.

By constructing the device as or substantially as shown and described, swinging of the lever 20 will, by means of the gear 18 and pinion 17, turn the shaft 11 and wheel 7 so as to move the chain 6 in the required manner. Movement of this chain swings the draw bar 3 around its pivot 4 and thus shifts the line of draft toward either side of the machine as occasion may demand.

From the foregoing, taken in connection with the accompanying drawing, it will be observed that although the invention is of simple and inexpensive nature, it will be highly efficient and durable. For these reasons the construction shown and described constitutes the preferred embodiment of the shifting means, but it is to be understood that within the scope of the invention as claimed, numerous changes may be made without sacrificing the principal advantages.

I claim:

The combination with a tractor frame having a longitudinally disposed draw-bar pivoted at its front end for lateral swinging; of wheels at opposite sides of the tractor frame, an endless chain trained around said wheels and having one of its reaches secured to said draw-bar, a vertical shaft on the lower end of which one of said wheels is carried, an inverted L-shaped bracket rising from the tractor frame and rotatably receiving in its horizontal arm the upper end of said shaft, a pinion on said shaft and a gear meshing with said pinion, a second vertical shaft on which said gear is carried, said second shaft being also rotatably mounted at its upper end in the horizontal arm of said bracket, a lever extending horizontally from said second shaft for turning the same at will, a dog carried by said lever and a rack on the free end of said horizontal arm of the bracket and coacting with said dog to lock the lever in adjusted position.

SPEAR S. HOLLINGSWORTH.

Copies of this patent may be obtained for five cents each, by addressing the "Commissioner of Patents, Washington, D. C."